United States Patent [19]

Moll

[11] Patent Number: 5,339,941

[45] Date of Patent: Aug. 23, 1994

[54] PROCESS AND DEVICE FOR ALIGNING AND CO-PROCESSING FLACCID WORKPIECE LAYERS

[76] Inventor: Philipp Moll, Königsberger Strasse 74, 5100 Aachen, Fed. Rep. of Germany

[21] Appl. No.: 838,786

[22] PCT Filed: Sep. 18, 1990

[86] PCT No.: PCT/EP90/01588

§ 371 Date: Apr. 21, 1992

§ 102(e) Date: Apr. 21, 1992

[87] PCT Pub. No.: WO91/03958

PCT Pub. Date: Apr. 4, 1991

[30] Foreign Application Priority Data

Sep. 22, 1989 [DE] Fed. Rep. of Germany ....... 3931662

[51] Int. Cl.$^5$ .............................................. B65G 47/00
[52] U.S. Cl. .............................. 198/345.3; 198/465.4; 271/227
[58] Field of Search .................. 198/345.3, 465.4; 271/204, 206, 226, 227, 228, 277, 241, 82, 85

[56] References Cited

U.S. PATENT DOCUMENTS

| | | | |
|---|---|---|---|
| 3,726,399 | 4/1973 | Beamish et al. | 271/1 X |
| 3,897,945 | 8/1975 | Faltot et al. | 271/227 |
| 4,917,369 | 4/1990 | Moll et al. | 198/465.4 X |
| 5,012,752 | 5/1991 | Murata et al. | 271/227 X |

Primary Examiner—D. Glenn Dayoan
Attorney, Agent, or Firm—McGlew & Tuttle

[57] ABSTRACT

Process and device for aligning and jointly processing flaccid workpiece layers (4, 104). The workpiece layers (4, 104) to be processed jointly are brought toward one another in the hanging position by endless conveyors (1, 101). A scanning and aligning station (10) is located in the delivery path of the two endless conveyors (1, 101). The workpiece layer is temporarily removed from the respective conveyor in at least one of the endless conveyors and aligned in relation to the other workpiece layer. The workpiece layer is then returned in the aligned position to the conveyor. After which the workpiece layers that are associated with one another will leave the scanning and aligning station (10) together. The present invention permits simplified fastening of clamps (16, 17; 116, 117) for the workpiece layers to the endless conveyors. They are fixed there by permanent magnets (14; 114), whose magnetic field in the scanning and aligning station (10) is temporarily abolished in order for the alignment process to be able to be carried out with low friction.

14 Claims, 3 Drawing Sheets

PROCESS AND DEVICE FOR ALIGNING AND CO-PROCESSING FLACCID WORKPIECE LAYERS

FIELD OF THE INVENTION

The present invention pertains in general to a process and device for transporting flaccid workpieces to a scanning and aligning station where the workpieces are scanned and then aligned with each other and then transported away from the scanning and aligning station. More specifically the present invention describes a process and device where at least one of the workpieces is removed from a conveying means aligned with the other workpiece and then reattached to the conveying means and both the workpieces are transported away in alignment.

BACKGROUND OF THE INVENTION

Similar processes and devices are known from European Paten Disclosure Document #EP-OS 0,260,331. In the prior-art process, the workpiece layers are fed to each other by conveying means. The conveying means comprise rail-guided carriages on which clamps are arranged holding the upper end of the workpiece layers. These conveying means have track sections directed in parallel to one another in a scanning station and an aligning station. To make possible the mutual alignment of the workpiece layers, the clamps are arranged on the carriages of one of the conveying means by means of a holding head which is movable in a plurality of directions in relation to the carriage carrying it. This holding head carries a magnetizable plate which comes into frictionally engaged contact in the aligning station with a permanent magnet that is fastened to the adjacent carriage of the other conveying means. Using an adjusting device of the stationary aligning station, the movable holding head of the clamps on the first-named carriage is adjusted, corresponding to the scanning result, such that the two workpiece layers that are adjacent to one another in the aligning station will reach the predetermined relative position. Based on the frictional engagement between the magnetizable plate on the holding head of one carriage and the permanent magnet on the other carriage, this relative position is maintained when the two carriages move together from the aligning station into the subsequent processing station after alignment of the workpiece layers.

This design is relatively complicated, because it requires an adjustable holding head that is adjustable in a plurality of directions at each of the carriages of one conveying means. In addition, to adjusting the holding heads, the adjusting device must exert a considerable force to reach the specified relative position of the two workpiece layers in order to overcome the frictional force between the magnetizable plate and the permanent magnet, which must, as is explained, be strong enough to maintain the relative position, once set, between the permanent magnet and the plate and consequently the aligned position of the workpiece layers.

SUMMARY AND OBJECTS OF THE INVENTION

The basic task of the present invention is to provide a process that is designed such that it can be carried out with a device of simple design.

This task is accomplished by the transporting the first workpiece in a substantially flat hanging position from a first transport means. The second workpiece is also transported in a substantially flat position from a second transport means. The first and second workpieces are transported to a scanning and aligning station. At the scanning and aligning station one of the workpieces is removed from the respective transporting means and aligned with the other workpiece. After alignment has been completed the detached workpiece is reattached to the respective transport means. The two workpieces are then aligned and transported in a substantially aligned manner for further processing.

A reduction of the overall alignment time is achieved if both workpieces are detached from the respective transport means at the scanning and alignment station. During alignment each workpiece is moved in a direction substantially opposite the moving direction of the other workpiece. Both workpieces are then reattached to the respective transport means. Since each workpiece only has to move half the distance, the alignment time is minimized. The alignment of the two workpieces can be done with respect to a reference line which may be a path of movement of a sewing machine moving along a straight line relative to the aligned workpiece layers. If the angular alignment of the workpiece layers is also carried out by aligning movements taking place in opposite directions, and the reference line is the bisector of the respective starting position of a defined edge of the workpiece layers, it may be advantageous to adjust the path of movement of the sewing machine by correspondingly pivoting a guide rail carrying the sewing machine if the workpiece layers are connected by a sewing machine being moved along a straight line in relation to the workpiece layers.

Another task of the present invention is to provide a device for carrying out the process, which is of simple design and does not require strong adjusting forces during the alignment of the workpiece layers.

The transport means have carriage means for connecting the workpieces to the transport means or conveying means. The carriage means also have a carriage magnet. A clamp means holds the workpiece in a substantially flat hanging position and has a magnetizable support means in the form of a plate. This support plate attaches to the carriage means by the attraction of the carriage magnet. In the scanning and aligning station there is a scanning means for determining the relative position between the first and second workpieces. The scanning and aligning station also has an alignment device. The alignment device has an aligning magnet means for magnetically transferring the clamp means from the carriage means to the aligning device. The aligning magnetic means has a magnetic field intensity that is switchable. This is preferably incorporated by an electromagnet. The carriage magnet can be a permanent magnet with the coil surrounding it. In this way the magnetic fields of both magnets are controllable and the support plate of the clamp means can be attracted to either one of the magnets.

The aligning device has an adjusting means for moving the alignment magnet and the attached clamp means. Adjusting means working in cooperation with the scanning means then aligns the two workpieces.

The present invention contains a hingedly movable device at the scanning and aligning station only, while the holding devices on the carriages are essentially "rigid." During alignment, no adhesive and sliding friction forces between the magnet and the magnetizable plate need be overcome, because the friction between the holding devices of the workpiece layer(s) to be aligned and the associated transport means, which are designed as, e.g., carriages, is abolished during alignment. Together with the workpiece, the holding device is completely detached from the transport means, aligned, and then again transferred to the transport mechanism, where it will cling in frictional engagement due to the force generated by the magnet and maintains the position which it assumes there.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
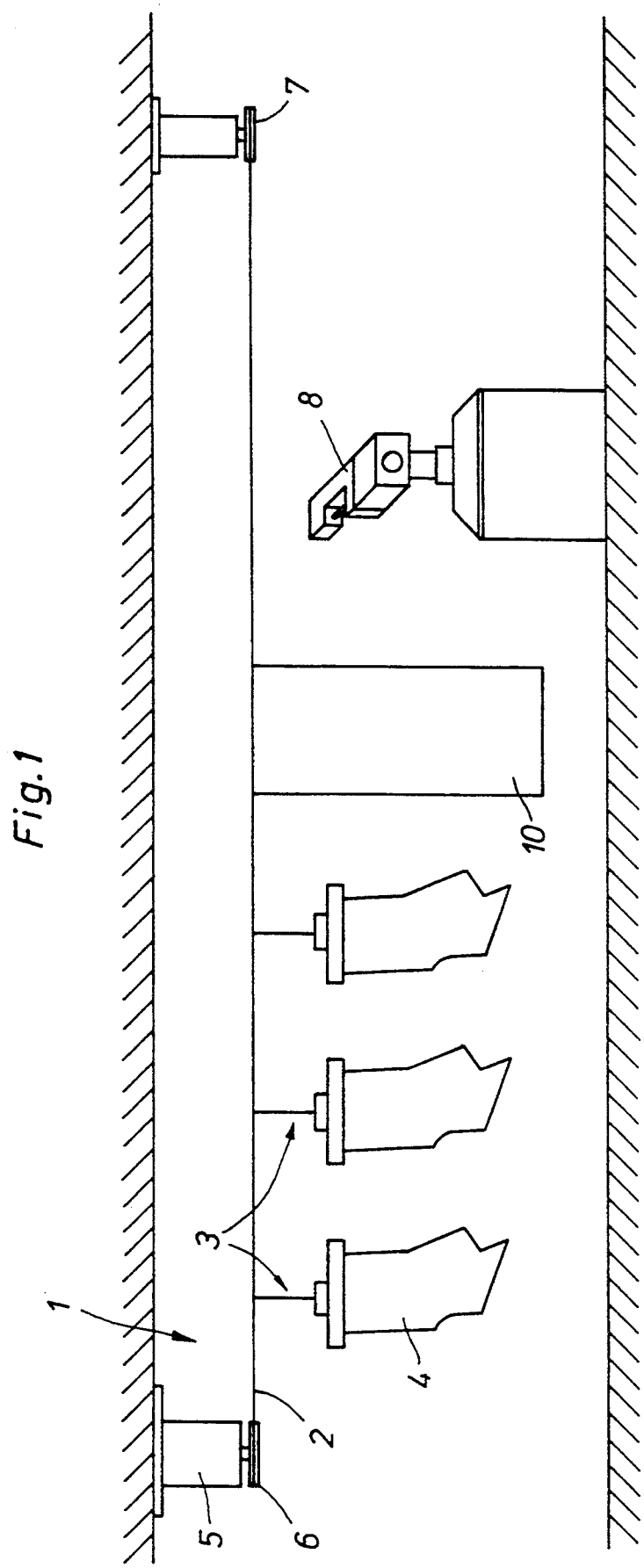
FIG. 1 is a synoptic view of a unit for feeding flaccid workpiece parts, e.g., fabric cuts, to a scanning and aligning station, as well as to a subsequent processing station, which is a sewing robot in this case.

Referring to the drawings, and in particular to FIG. 1, a conveying means 1 has a plurality of carriages 3 which serve as transport mechanisms and on which workpiece parts 4 hang. The carriages 3 are moved by means of an endless circulating chain 2. Even though only three carriages 3 are shown in this case, it is obvious that the chain is equipped with carriages 3 spaced at regular distances. The chain 2 travels along an endless path around a wheel 6 driven by a motor 5 and a deflecting wheel 7 arranged at a spaced location from it. A scanning and aligning station 10 is located in the travel path of the chain 2. A sewing robot 8 is located downstream of the scanning and aligning station when viewed in the direction of movement of the chain 2.

It should be noted that only one conveying means, whose transport path extends through the scanning and aligning station 10, is shown in FIG. 1. However, to carry out the process according to the present invention, at least two of the conveying means are needed. Of the two conveying means, the second also has a track section that extends through the scanning and aligning station 10. For clarity's sake, the second conveying means is not shown in FIG. 1. However, it is recognizable in FIG. 2.

Figure 2:
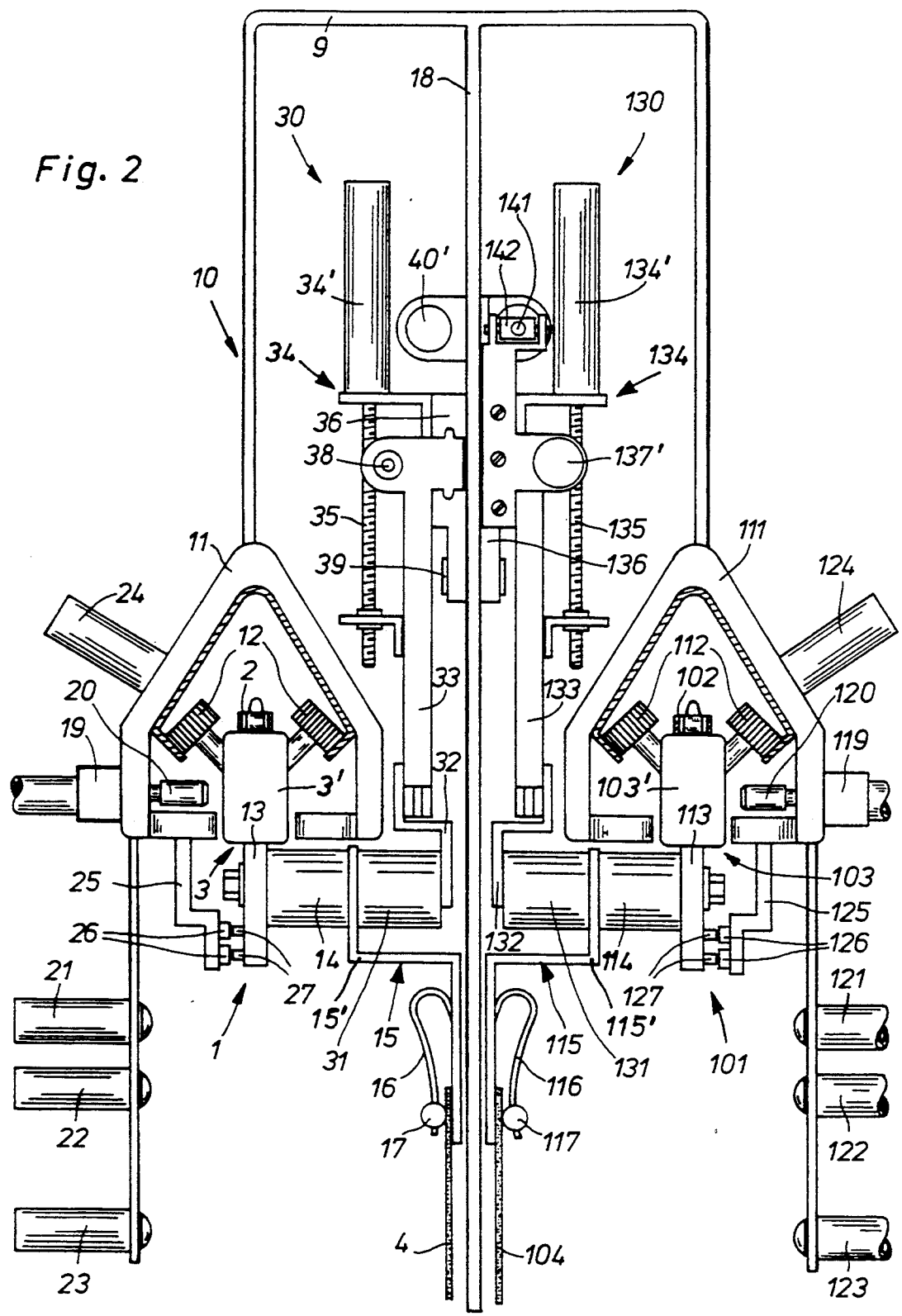
FIG. 2 shows a sectional view of the scanning and aligning station.

FIG. 2 shows a front view of the scanning and aligning station 10. Two guide rails 11 and 111, which are fastened to a common support frame 9, extend through this scanning and aligning station in parallel to one another. The guide rails 11 and 111 carry carriages 3 and 103, which belong to two separate conveying means, designated in their entirety by 1 and 101, respectively. Each carriage 3 and 103 is provided with runners 12 and 112, respectively, which guide the carriages 3 and 103, respectively, on the respective guide rail 11 and 111.

Only one of the carriages and the elements associated with it will be described below. Since the other carriage and the elements associated with it are completely comparable, they are designated by reference numerals increased by 100.

A holding plate 13 is fastened to the carriage 3, and the holding plate 3 carries a permanent carriage magnet 14. The permanent carriage magnet 14 is surrounded by a coil which is not recognizable in FIG. 2. By means of the coil a magnetic field is generated which opposes the magnetic field of the permanent carriage magnet 14. This opposing magnetic field is generated in order to cancel the magnetic effect of the permanent carriage magnet 14. Two bus bars 26, which are arranged stationarily on a bracket 25 cooperate with two sliding contacts 27 that are arranged on the holding plate 13. The sliding contacts 27 are in electrical connection with the coil, are used to supply the coil with power. The permanent carriage magnet 14 carries, due to the magnetic holding force it generates, a magnetizable support 15 made of a plate of ferromagnetic material, to which a clamp 16 with a displaceable clamping body 17 is fastened. The clamp 16 with the displaceable clamping body 17 is able to clamp between it and the support plate 15 a flaccid workpiece layer 4, which hangs down from the support plate 15. The workpiece layer hanging down now extends in a vertical plane at a closely spaced location from and in parallel to the intermediate plate 18. The intermediate plate 18 also extends vertically and is fastened to the support frame 9. Intermediate plate 18 is designed at least partially as an optically reflecting intermediate plate.

A pneumatic cylinder 19 is fastened at the side to the guide rail 11, and the pneumatic cylinder 19 has a thrust piece 20 that can be pushed forward toward the carriage 3 in order to fix it in the scanning and aligning station 10. The pneumatic cylinder 19 is connected to a prior-art control device, which is therefore not shown. Reflected light photocells 21, 22, and 23, which cooperate with the intermediate plate 18, are also fastened to the guide rail 11 in an area that is adjacent to the area that is occupied by a workpiece layer 4 when it is located in the scanning and aligning station 10. The reflected light photocells 21, 22, and 23 are thus able to detect the alignment of the workpiece layer 4 and to send corresponding signals. The reflected light photocells 21, 22, and 23 are also connected to the above-mentioned control device. A reflected light photocell 24, which serves to recognize the carriage 3, is arranged in the vicinity of the position which carriage 3 assumes in the scanning and aligning station 10. This reflected light photocell 24 is also connected to the above-mentioned control device.

An aligning device, designated in its entirety by 30, is arranged on the support frame 9 in the scanning and aligning station 10. The aligning device 30 comprises an aligning electromagnet 31 which generates a magnetic field that is able to carry the support plate 15 with the workpiece layer 4 hanging on it. When carriage 3 is fixed by the thrust piece 20 of the pneumatic cylinder 19 in the scanning and aligning station 10, the aligning electromagnet 31 is located on the scanning and aligning station 10 at a site that is opposite the support plate 15. The aligning electromagnet 31 will hereinafter be characterized essentially as a stationary electromagnet in order to clearly distinguish it from the permanent magnet that is carried by the carriage 3 which is consequently a "movable" permanent magnet. The aligning electromagnet 31 is fastened to a holder 32, which can be adjusted by an electric motor in a plurality of directions in a plane that extends in parallel to the plane defined by the workpiece layer 4.

Figure 3:
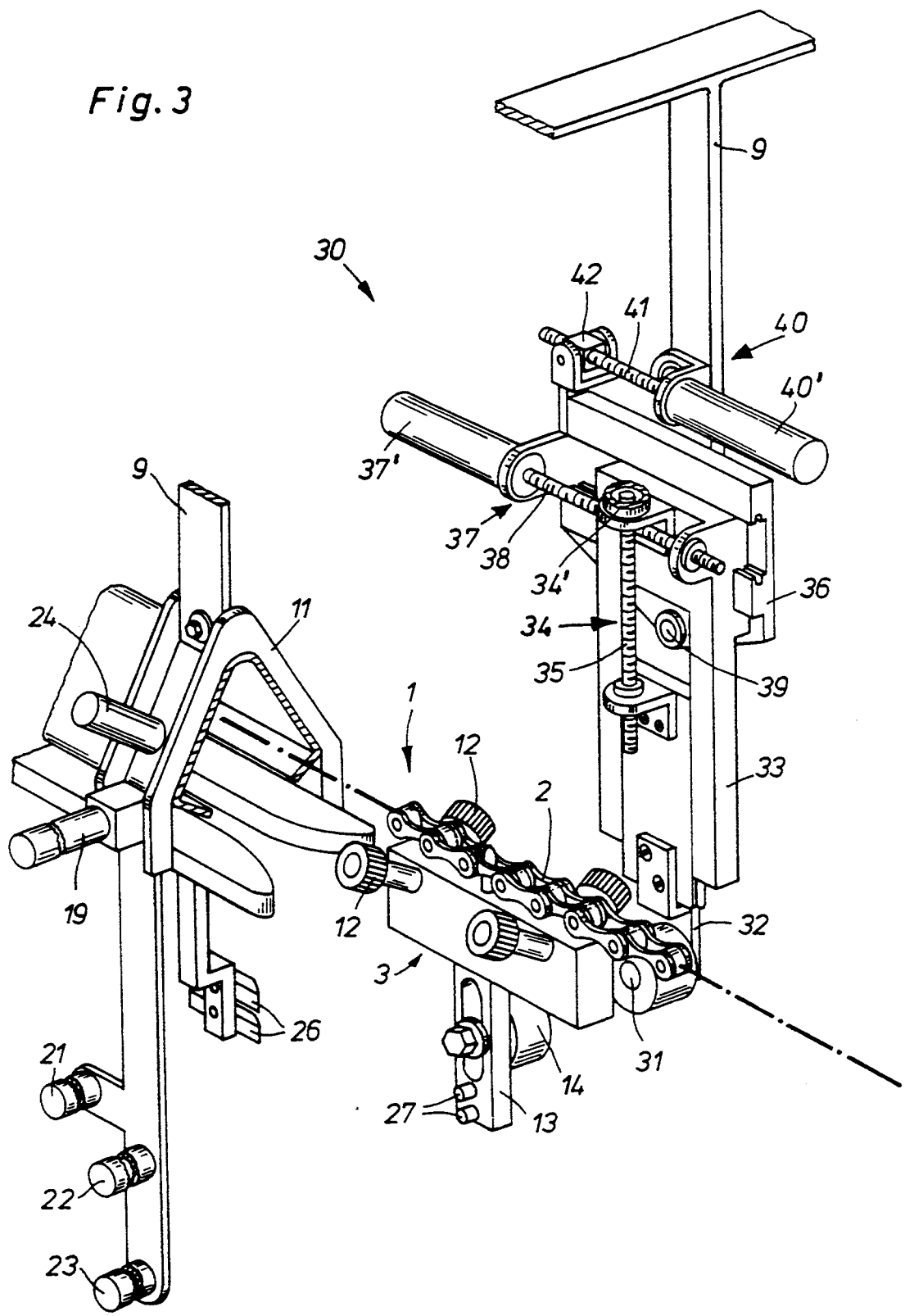
FIG. 3 shows a perspective detail of the essential elements of the aligning device in the scanning and aligning station.

As is shown in FIG. 3, the holder 32 is guided longitudinally displaceably in a first rail 33 that extends essentially vertically- A first electric motor 34 (cf. FIG. 2), is fastened to the rail 33 and by means of the first electric motor 34, the holder 32 can be adjusted in the vertical direction via a threaded spindle 35. The first rail 33 is guided displaceably on a second rail 36 in an essentially horizontal direction. The first rail 33 is displaced in relation to the second rail 36 by means of an second electric motor 37, fastened to the second rail 36, and a threaded spindle 38. The aligning electromagnet 31 is consequently movable in two mutually substantially perpendicular directions in the manner of a cross slide guide.

The second rail 36 is pivotably mounted on the support frame 9 by means of a pivot pin, and the plane of pivoting is located in a plane containing the two mutually substantially perpendicular directions in which the aligning electromagnet 31 is moved by the spindles 35 and 38. Pivoting movement of the second rail 36 can be brought about by means of a third electric motor 40, which is hinged to the support frame 9 and drives a third threaded spindle 41. The third threaded spindle passes through a threaded block 42 that is hinged to the second rail 36.

The electric motors 34, 37, and 40 are preferably stepping motors, because such motors can be set very accurately and are particularly suitable, especially for digital energization. These electric motors are also connected to the above-mentioned control device and are adjusted by the control device depending on the signals sent by the reflected light photocells 21, 22, and 23.

The following movements of the electric magnet 31 can thus be brought about: a) up and down movement in the direction determined by the first threaded spindle 35 by means of the first electric motor 34; b) a movement essentially in parallel to the path of movement of the carriage 3 in the direction determined by the second threaded spindle 38 by means of the second electric motor 37; and c) a pivoting movement around the pivot pin 39 by means of the third electric motor 40 and the third threaded spindle 41 driven by it.

The mode of operation of the device shown is as follows:

In the normal state of transport of the workpiece layers 4, as shown in FIG. 1, the coils on the permanent magnets 14, which are carried by the carriages 3, are not energized, so that the permanent magnets 14 hold the support plates 15 with the workpiece layers 4 hanging on them. The aligning electromagnet 31 is not energized. When a carriage 3 has arrived in the scanning and aligning station 10, the chain 2 of the conveying means is temporarily stopped, so that all the carriages 3 carried by it will come to a stop. The carriage 3 located in the scanning and aligning station 10 is fixed in the stopped position in the scanning and aligning station 10. The magnetic field of the permanent carriage magnet 14 is then neutralized by energizing the coil belonging to the permanent carriage magnet 14. The aligning electromagnet 31 is energized at the same time, so that aligning electromagnet 31 will now hold the support plate 15 with the workpiece layer 4 hanging on it, while the permanent carriage magnet 14 is released from the support plate 15.

The workpiece layer 104, which is to be processed together with the workpiece layer 4, is simultaneously delivered by the other conveying means, which is designated in its entirety by the reference numeral 101 in FIG. 2. The workpiece layer 104 is delivered into the scanning and aligning station 10, and is stopped in the scanning and aligning station 10. The reflected light photocells 21, 22, 23, and 121, 122, and 123 now detect the positions of the workpiece layers 4 and 104 and send corresponding measurement signals to the control device (not shown). The control device generates control commands necessary for the alignment of the two workpiece layers 4 and 104 according to predetermined specifications. These control commands are sent as signals to the electric motors 34, 37, and 40 of the aligning device 30. The angular position of the front edge of the workpiece layers 4, 104, which extend in the downward direction, is first determined by the reflected light photocells 22, 23 and 122, 123. Angular alignment of the workpiece layers 4 and 104 is performed by energizing the electric motor 40 and/or 140 in the case of deviations from the desired aligned position. The relative vertical position of the two workpiece layers 4 and 104, on the one hand, and, on the other hand, the relative horizontal position of the two workpiece layers 4 and 104 are then determined by means of the reflected light photocells 21, 23 and 121, 123. Mutual alignment of the workpiece layers 4 and 104 is performed by energizing the corresponding electric motors 34; 37; 134; 137 in the case of a difference. The vertical and horizontal alignments are performed by simultaneously energizing the corresponding electric motors 34, 134 and 37, 137, respectively, of the two aligning devices 30, 130 in opposite directions, as a result of which the time needed for alignment is reduced to a minimum.

The alignment of the workpiece layers 4 and 104 may be performed without appreciable frictional forces between the respective support plate 15; 115 and the corresponding permanent magnets 14; 114. This occurs because The magnetic field of the permanent magnets 14:114 is canceled by that of the surrounding current-carrying coils. Once the necessary alignment has been accomplished, energization of the coil is abolished, so that the permanent magnets 14; 114 will again develop its attracting force, and the energization of the opposing electromagnets 31, 131 is turned off, so that the support plates 15; 115 will again be transferred to the permanent magnets 14; 114. As was mentioned above, the holding force of the permanent magnets 14; 114 selected to be sufficient so that the position of the support plate 15; 115 on the permanent magnets 14:114 cannot change. The two conveying means 1, 101 are then again put into operation, so that the two workpiece layers 4 and 104 will leave the scanning and aligning station 10 together and in a mutually aligned position.

It should be pointed out that it is sufficient for alignment purposes to move only one of the workpiece layers 4 or 104 with the corresponding aligning device 30 or 130 shown in FIG. 3 to bring about mutual alignment. It is not necessary for the other conveying means also to be designed in the above-described manner. It is consequently possible, for example, to abandon the permanent magnets 114 on the carriage 103 of the other conveying device 101. The support plates 115 may be permanently, i.e., nondetachably, connected to the carriages 103 there, and the aligning device 130 associated with the conveying means 101 may be absent in the scanning and aligning station 10. However, the reflected light photocells 121, 122, and 123 for scanning the fabric layer 104 must always be present. The embodiment of the device shown in FIG. 2, in which the two conveying means 1, 101 have the same design and aligning device 30 and 130 associated with the two conveying means 1, 101, respectively, in the scanning and aligning station 10, offers the above-described advantage of more rapid operation and an increased in the possibilities for correction.

I claim:

1. A process for aligning first and second flaccid workpiece layers, the process comprising the steps of:
   transporting the first workpiece in a substantially flat hanging position from a first transport means;
   transporting the second workpiece in a substantially flat hanging position from a second transport means;
   detaching one of said first and second workpieces from said respective transporting means;
   aligning said detached workpiece with the other workpiece in one of substantially horizontal and vertical directions;
   reattaching said detached workpiece to said respective transport means; and
   transporting said aligned first and second workpieces together in a substantially aligned manner for further processing.

2. Process in accordance with claim 1, further comprising:
   detaching the other of said first and second workpieces from said respective transporting means before said alignment; and
   said workpieces are aligned with one of an edge and reference points of an edge, being substantially in parallel with a predetermined reference line, said alignment being by moving said detached first and second workpieces in substantially opposite directions, said substantially opposite directions being one of substantially parallel and perpendicular to said predetermined reference line.

3. Process in accordance with claim 1, wherein:
   said reference line forms a bisector of a respective starting position of said alignment edge of the first and second workpieces.

4. Process in accordance with one of the preceding claims 1 through 3, further comprising:
   stopping said transporting of the first and second workpieces before said detaching; and
   restarting said transporting after said aligning of the workpieces.

5. A device for aligning first and second flaccid workpiece layers, the device comprising:
   a first conveying means for transporting the first workpiece along a first path, said first conveying means having carriage means for connecting the first workpiece to said first conveying means, said carriage means having a carriage magnet;
   first clamp means for holding the first workpiece in a substantially flat hanging portion, said clamp means having a magnetizable support means for attaching to said carriage magnet;
   a second conveying means for transporting the second workpiece along a second path, said second path having a portion adjacent said first path, said second conveying means having carriage means for connecting the second workpiece to said second conveying means, said carriage means having a carriage magnet;
   second clamp means for holding the second workpiece in a substantially flat hanging position, said clamp means having a magnetizable support means for attaching to said carriage magnet;
   a scanning and aligning station positioned in said first and second path at said portion where said first path is adjacent said second path, said scanning and aligning station having scanning means for determining the relative position of the first and second workpieces, said scanning and aligning station also having an alignment device movably connected to said scanning and alignment station, said aligning device having an aligning magnet means for magneticly transferring one of said first and second clamp means from said carriage means to said aligning device, said aligning magnet attaching to said magnetizable support, said aligning magnetic means having a magnetic field intensity alternatingly switchable with a field intensity of said carriage magnet to transfer said one of said first and second clamp means to said aligning device, said aligning device having adjusting means for adjusting a position of one of the first and second workpieces relative to the other of the first and second workpieces.

6. Device in accordance with claim 5, wherein that the:
   said scanning and alignment station has another aligning device similar to said aligning device, said aligning device transferring said first clamp means from said first conveying means and said another aligning device transferring said second clamp means from said second conveying means; and
   said another aligning device having an adjusting means for adjusting a second position of the second workpiece substantially opposite to adjusting directions of said adjusting means of said aligning device.

7. Device in accordance with claim 5 or 6, wherein:
   said carriage magnet means has a permanent magnet and a coil means for generating a magnetic field substantially opposing a magnetic field of said permanent magnet.

8. Device in accordance with claim 7, wherein:
   said carriage means has electrical contact means for receiving power for said coil means; and
   said scanning and aligning station has electrical contact means for transferring said power to said electrical contact means of carriage means.

9. Device in accordance with claim 8, wherein:
   said contact means of said carriage means and said scanning and aligning station are sliding contacts.

10. Device in accordance with claim 5, wherein:
    said adjusting means displaceably guides said aligning magnet means in a first, substantially vertically extending rail.

11. Device in accordance with claim 10, wherein:
    said first rail is displaceably guided on a second rail extending transversely to said first rail.

12. Device in accordance with claim 11, wherein:
    said second rail is pivotably mounted on a stationary support structure.

13. Device in accordance with claim 5, wherein:
    said aligning device is driven by an electric motor.

14. Device in accordance with claim 5, wherein:
    said adjusting means has electric motors designed as stepping motors.

* * * * *